United States Patent
Kong et al.

(10) Patent No.: US 12,136,736 B2
(45) Date of Patent: Nov. 5, 2024

(54) POUCH-SHAPED CASE FORMING APPARATUS AND METHOD OF MANUFACTURING POUCH-SHAPED CASE USING THE SAME

(71) Applicant: LG Energy Solution, Ltd., Seoul (KR)

(72) Inventors: Tae Yoon Kong, Daejeon (KR); Shin Hwa Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 78 days.

(21) Appl. No.: 17/778,641

(22) PCT Filed: Nov. 19, 2020

(86) PCT No.: PCT/KR2020/016391
§ 371 (c)(1),
(2) Date: May 20, 2022

(87) PCT Pub. No.: WO2021/107505
PCT Pub. Date: Jun. 3, 2021

(65) Prior Publication Data
US 2022/0399600 A1   Dec. 15, 2022

(30) Foreign Application Priority Data
Nov. 26, 2019  (KR) .......................... 10-2019-0153141

(51) Int. Cl.
*H01M 50/105* (2021.01)
*B21D 22/20* (2006.01)
(Continued)

(52) U.S. Cl.
CPC ........ *H01M 50/105* (2021.01); *B21D 22/203* (2013.01); *B21D 22/21* (2013.01);
(Continued)

(58) Field of Classification Search
CPC ...................... H01M 50/105; H01M 10/052; B21D 22/203; B21D 22/21; B21D 22/26; B21D 22/20; B21D 22/02; B21D 22/06; B21D 51/16; B21D 51/18; B21D 37/10; B29C 33/24; B29C 43/56; B29L 2031/7146
(Continued)

(56) References Cited

U.S. PATENT DOCUMENTS 7,704,427 B2   4/2010  Fujii
9,887,393 B2 * 2/2018  Baba ................... H01M 50/107
(Continued)

FOREIGN PATENT DOCUMENTS

JP   H11-144692 A    5/1999
JP   2002367574 A   12/2002
(Continued)

OTHER PUBLICATIONS

Machine translation of KR 20180083124 A (Year: 2018).*
(Continued)

*Primary Examiner* — Christopher L Templeton
*Assistant Examiner* — Teresa A Guthrie
(74) *Attorney, Agent, or Firm* — Lerner David LLP (57) ABSTRACT

A pouch-shaped case forming apparatus for forming a pouch-shaped case has a terrace step, wherein there are no dents or wrinkles at a pouch folding portion of the pouch-shaped case.

9 Claims, 9 Drawing Sheets (51) Int. Cl.
*B21D 22/21* (2006.01)
*B21D 22/26* (2006.01)
*B21D 51/16* (2006.01)
*B29C 33/42* (2006.01)
*B29C 43/36* (2006.01)
*B29L 31/00* (2006.01)
*H01M 10/052* (2010.01)

(52) U.S. Cl.
CPC ............. *B21D 22/26* (2013.01); *B21D 51/16* (2013.01); *B29C 33/42* (2013.01); *B29C 43/36* (2013.01); *H01M 10/052* (2013.01); *B29L 2031/7146* (2013.01)

(58) Field of Classification Search
USPC .......................................................... 72/348
See application file for complete search history.

(56) References Cited

U.S. PATENT DOCUMENTS

| | | | |
|---|---|---|---|
| 2014/0304980 A1 | 10/2014 | Kim et al. | |
| 2015/0022957 A1 | 1/2015 | Hiroki et al. | |
| 2018/0219245 A1 | 8/2018 | Choi et al. | |
| 2018/0366690 A1* | 12/2018 | Levin | H01M 50/119 |
| 2019/0229301 A1 | 7/2019 | Li et al. | |
| 2020/0280044 A1 | 9/2020 | Park et al. | |
| 2020/0331187 A1 | 10/2020 | Suh et al. | |
| 2023/0071692 A1* | 3/2023 | Yun | H01M 10/0463 |

FOREIGN PATENT DOCUMENTS

| | | | |
|---|---|---|---|
| JP | 2003-077426 A | | 3/2003 |
| JP | 2004-319099 A | | 11/2004 |
| JP | 2008-243410 A | | 10/2008 |
| JP | 2013031998 A | | 2/2013 |
| JP | 2013206678 A | | 10/2013 |
| JP | 2015-38868 A | | 2/2015 |
| JP | 2018-527719 A | | 9/2018 |
| KR | 900009158 Y1 | | 10/1990 |
| KR | 200207948 Y1 | | 1/2001 |
| KR | 20170022156 A | | 3/2017 |
| KR | 20180055427 A | | 5/2018 |
| KR | 20180062874 A | | 6/2018 |
| KR | 20180083124 A | * | 7/2018 |
| KR | 20190090153 A | | 8/2019 |
| KR | 20190105765 A | | 9/2019 |
| KR | 20190106473 A | | 9/2019 |
| KR | 20220142025 A | * | 10/2022 |
| WO | 2013141527 A1 | | 9/2013 |

OTHER PUBLICATIONS

Extended European Search Report for Application No. 20891580.1 dated Nov. 16, 2022. 8 pgs.
Search report from International Application No. PCT/KR2020/016391, mailed Mar. 9, 2021.

* cited by examiner

[FIG. 1]

--Prior Art--

--Prior Art--

[FIG. 3]

--Prior Art--

[FIG. 4]

--Prior Art--

[FIG. 5]

--Prior Art--

POUCH-SHAPED CASE FORMING APPARATUS AND METHOD OF MANUFACTURING POUCH-SHAPED CASE USING THE SAME

The present application is a national phase entry under 35 U.S.C. § 371 of International Application No. PCT/KR2020/016391 filed on Nov. 19, 2020, which claims priority from Korean Patent Application No. 2019-0153141 filed on Nov. 26, 2019, the disclosures of which are incorporated herein by reference in their entirety.

TECHNICAL FIELD

The present invention relates to a pouch-shaped case forming apparatus and a method of manufacturing a pouch-shaped case using the same. More particularly, the present invention relates to a two-cavity pouch forming apparatus for forming a pouch-shaped case having a terrace step and a method of manufacturing a pouch-shaped case having a terrace step using the same.

BACKGROUND ART

A pouch-shaped battery is manufactured by shaping an aluminum laminate sheet and receiving an electrode assembly therein. The aluminum laminate sheet is easy to deform, and therefore it is possible to manufacture the aluminum laminate sheet in various forms. In addition, since the aluminum laminate sheet is light, it is possible to produce various forms of pouch-shaped battery cases.

A pouch-shaped case, which is mainly used for batteries, is made of a soft packing material, such as an aluminum laminate sheet. The pouch-shaped case includes a case body having a concave receiving portion configured to allow an electrode assembly to be seated therein and a cover connected to one side of the body.

After the electrode assembly is seated in the receiving portion, the cover is brought into contact with the body, and contact portions between the cover and the body are coupled to each other by thermal fusion, whereby a pouch-shaped battery is manufactured. A sealing surplus portion (a terrace portion) is formed at a sealing region of the pouch-shaped case at which positive electrode tabs and negative electrode tabs are located.

Electronic devices are on a trend of increasing miniaturization and slimness. As a result, the thickness of a pouch-shaped battery is being further reduced. In the case in which the terrace portion is bent in the state in which a PCM is mounted, a problem in that the thickness of the battery is increased may occur. Even in the case in which an insulating tape is added to the vicinity of the terrace portion as needed, an increase in overall thickness of the battery is caused, and therefore it is necessary to minimize unnecessary waste of space.

Technologies for solving the problem related to thickness increase by simultaneously curving in the rear surface of the terrace portion and a portion of the upper end of the rear surface of the electrode assembly receiving portion to form a terrace step having a predetermined thickness and changing a conventional position at which the PCM is mounted to the terrace step or adding an insulating tape along the terrace step have been utilized.

In forming the terrace step, as described above, conventionally, an electrode assembly having electrode leads welded thereto is received in the laminate sheet, side folding is performed for side sealing, and the terrace portion is pressed using a press in the state of being fixed by a jig to form a terrace step. In this case, however, the side-folded region is widened.

Patent Document 1 discloses a method of forming a terrace step at a pouch of a pouch-shaped secondary battery before assembly of a cell. Patent Document 1 has an advantage in that widening of a side-folded region, which is caused in a method of forming a back terrace portion after assembly of the cell, does not occur.

Figure 1:
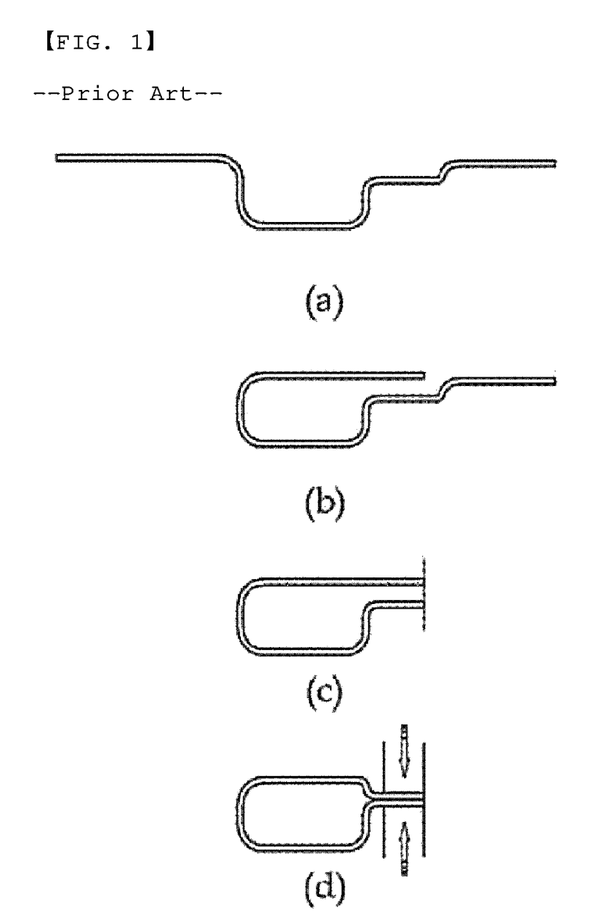
FIG. 1 is a view showing that a terrace step portion is formed in a pouch of a conventional pouch-shaped secondary battery before assembly of a cell.

The method of Patent Document 1 includes a step of forming a cup configured to receive an electrode assembly using a press including an upper punch, a lower die, and a stripper provided at the side surface of the punch and a step of forming a terrace step at a terrace portion connected to the cup in a stepped shape, which are performed before assembly of the cell. FIG. 1 shows steps of assembling the terrace step according to Patent Document 1 by way of example.

In Patent Document 1, the terrace step is formed by separate pressing in the final sealing step after the electrode assembly is received (see step (d) of FIG. 1). In the case in which a process of forming the case itself through such separate pressing is added to the process of manufacturing the pouch-shaped battery, there is a problem in that a manufacturing apparatus and process are complicated.

Patent Documents 2 and 3 are different from Patent Document 1 in that a terrace step is formed in advance. However, a bent portion of a pouch is inevitably necessary, and therefore wrinkles may easily occur.

Figure 2:
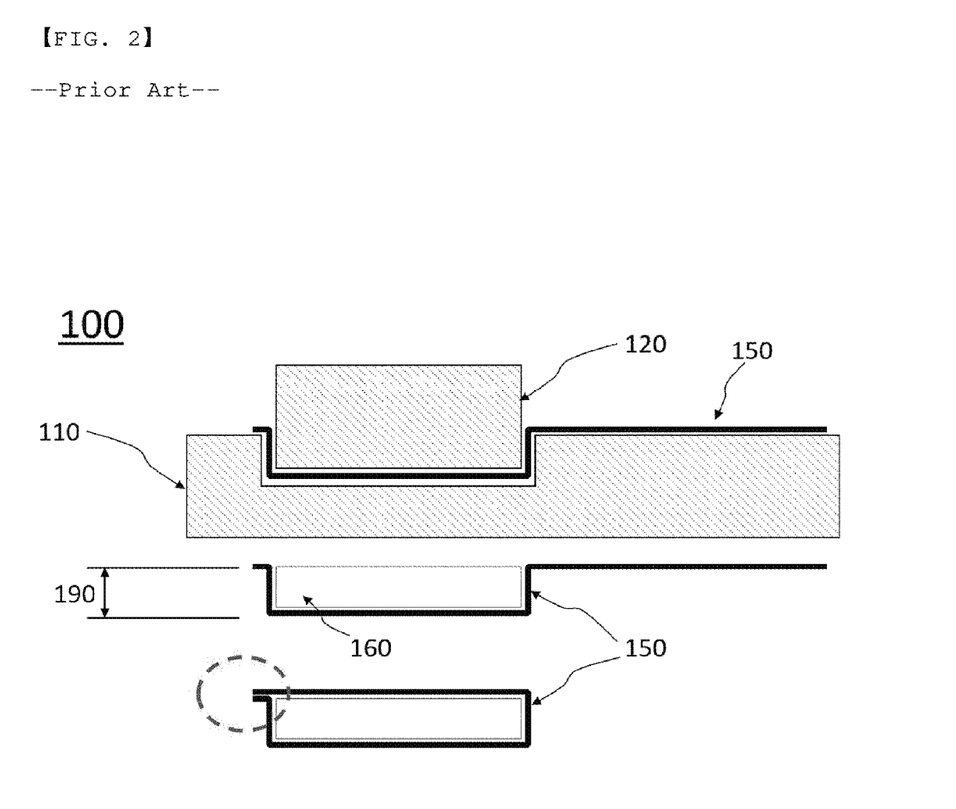
FIG. 2 is a sectional view of a conventional forming apparatus in the case in which there is no terrace step.
Figure 3:
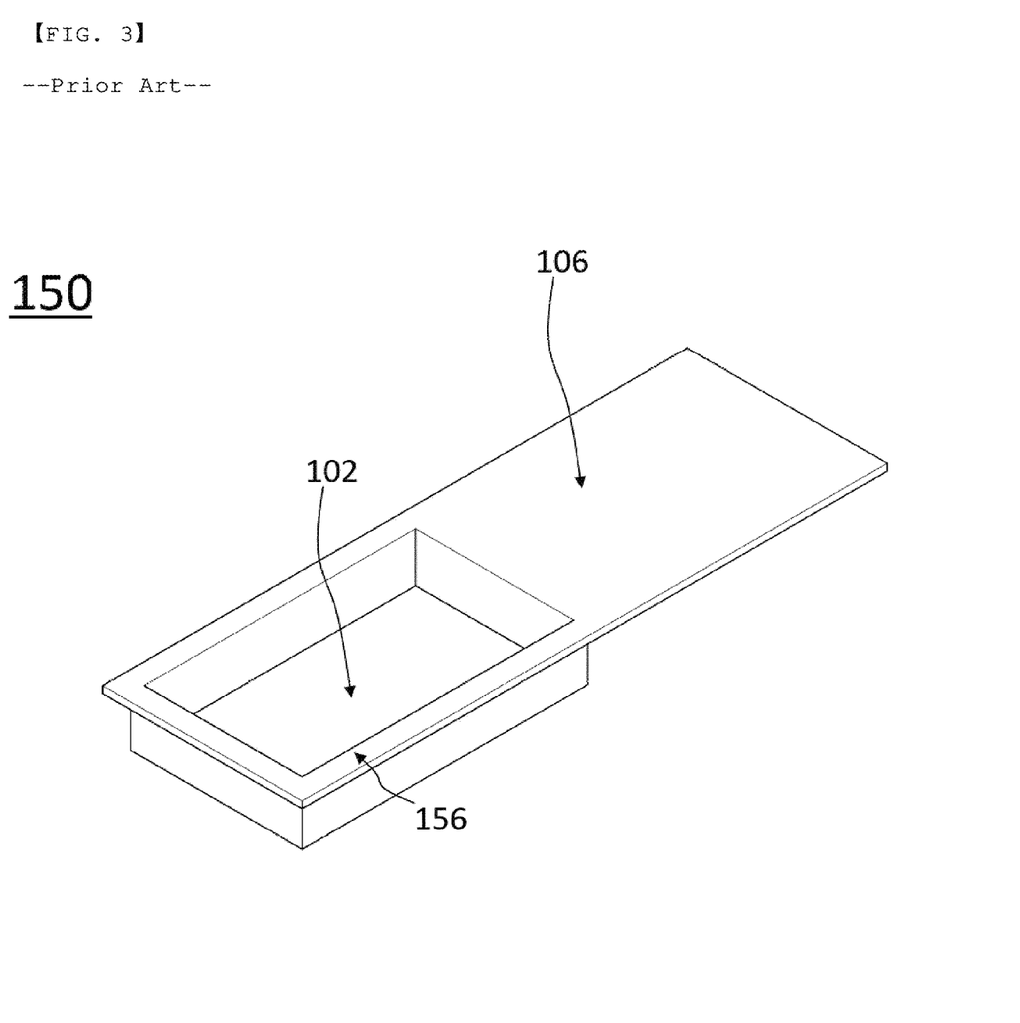
FIG. 3 is a perspective view of a pouch-shaped case manufactured using the same.

FIGS. 2 and 3 are a sectional view of a conventional forming apparatus 100 in the case in which there is no terrace step and a perspective view of a pouch-shaped case 150 manufactured using the same, respectively.

Referring to FIGS. 2 and 3, the pouch-shaped case 150 is placed on a forming apparatus base 110 and is pressed by a forming apparatus case die 120, whereby a receiving portion, in which an electrode assembly 160 is mounted, is formed. The electrode assembly 160 may be put in the receiving portion, a portion corresponding to the upper surface of the pouch-shaped case may be folded, and the case may be hermetically sealed. In this case, no terrace step is formed at a portion corresponding to a dotted-line circle. The electrode assembly 160 is received in only a lower receiving portion 102, and the pouch-shaped case 150 is provided at the upper part thereof with only an upper cover 106 having no receiving portion. The pouch-shaped case 150 is hermetically sealed after coupling of an outer circumferential portion 156.

In FIG. 2, the thickness of the electrode assembly 160 corresponds to 190 since no terrace step is formed.

Figure 4:
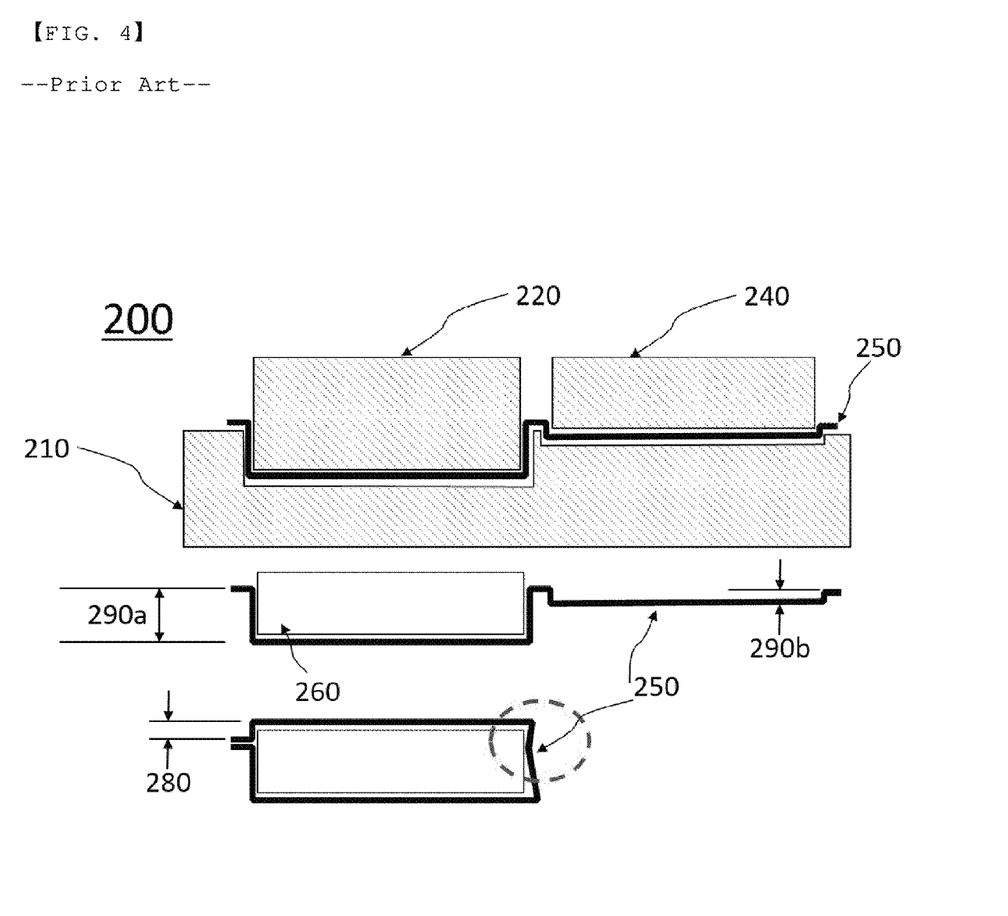
FIG. 4 is a sectional view of a conventional forming apparatus having two cavities configured to manufacture a pouch-shaped case having a terrace step.
Figure 5:
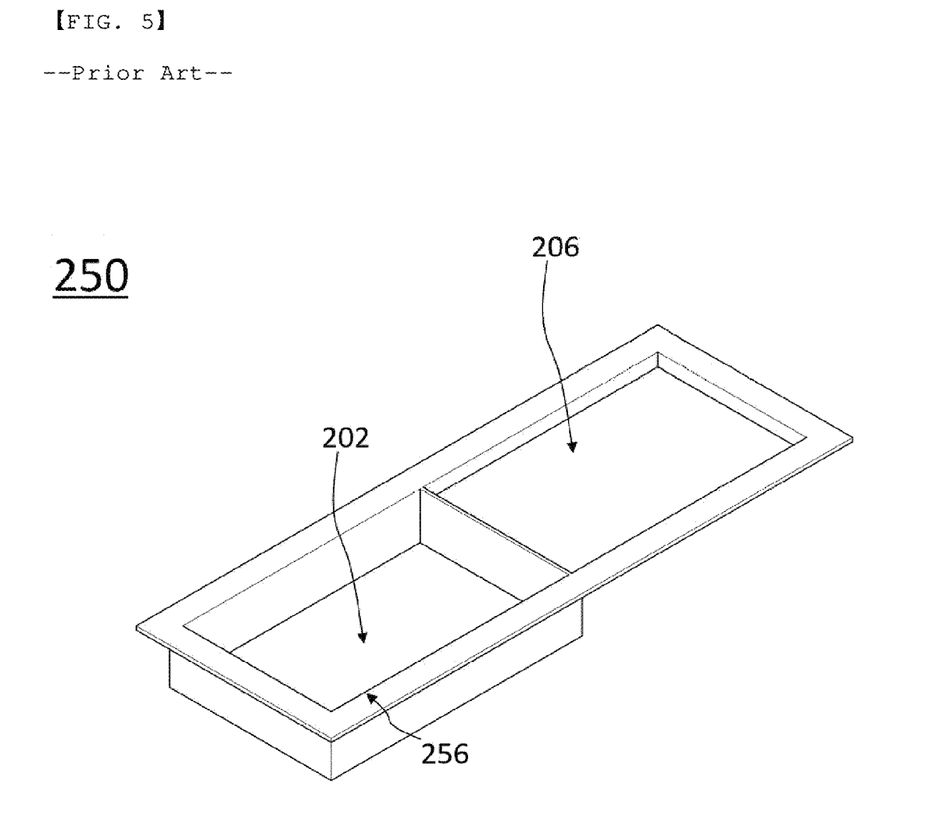
FIG. 5 is a perspective view of a pouch-shaped case manufactured using the same.

FIGS. 4 and 5 are a sectional view of a conventional forming apparatus 200 having two cavities configured to manufacture a pouch-shaped case having a terrace step and a perspective view of a pouch-shaped case 250 manufactured using the same, respectively.

Referring to FIG. 4, the pouch-shaped case 250 is placed on a forming apparatus base 210 and is pressed by two forming apparatus case dies 220 and 240, whereby receiving portions 202 and 206, in which an electrode assembly 260 is mounted, are formed. The electrode assembly 260 may be put in the lower receiving portion 202, a portion of the pouch-shaped case 250 including the upper receiving portion 206 may be folded so as to be coupled to the lower receiving portion 202, and an outer circumferential portion 256 may be hermetically sealed. In this case, dents and wrinkles occur at a pouch folding region, which is a portion corresponding to a dotted-line circle, although a terrace step is formed.

In FIGS. 4 and 5, the region in which the electrode assembly is received is divided by the terrace step, whereby the thickness of the electrode assembly that can be received in the pouch-shaped case 250 is a value obtained by adding 290a and 290b.

To date, the above problem has not been solved at the time of forming a pouch-shaped case having a terrace step.

Korean Patent Application Publication No. 2018-0083124 (2018 Jul. 20) ("Patent Document 1")

Korean Patent Application Publication No. 2018-0055427 (2018 May 25) ("Patent Document 2")

Korean Patent Application Publication No. 2019-0090153 (2019 Aug. 1) ("Patent Document 3")

DISCLOSURE

Technical Problem

The present invention has been made in view of the above problems, and it is an object of the present invention to provide a pouch-shaped case forming apparatus for forming a pouch-shaped case having a terrace step, wherein there are no dents or wrinkles at a pouch folding portion of the pouch-shaped case, a method of manufacturing a pouch-shaped case using the same, and a pouch-shaped case manufacturing using the forming apparatus.

Technical Solution

In order to accomplish the above object, the present invention provides a pouch-shaped case forming apparatus including: a forming apparatus base provided with recesses configured to manufacture a lower receiving portion of a pouch-shaped case configured to receive an electrode assembly therein and an upper receiving portion of the pouch-shaped case continuously connected to the lower receiving portion, the upper receiving portion being configured to receive the electrode assembly therein, by pressing; and a lower die of the forming apparatus and an upper die of the forming apparatus provided at the lower parts thereof with shapes corresponding to the recesses of the forming apparatus base, wherein the forming apparatus base includes: an upper surface start portion of the forming apparatus base, the upper surface start portion defining one end of the forming apparatus base, the upper surface start portion being disposed so as to be inclined downwards at a predetermined angle, the upper surface start portion being flat;

a side wall continuously connected to a distal end of the upper surface start portion of the forming apparatus base, the side wall extending downwards perpendicularly therefrom;

a base lower portion continuously connected to the side wall, the base lower portion being disposed so as to be inclined downwards at the same angle as the upper surface start portion of the forming apparatus base, the base lower portion being flat;

a base side portion continuously connected to the base lower portion, the base side portion extending upwards perpendicularly from the base lower portion;

a base upper portion continuously connected to the base side portion, the base upper portion being disposed so as to be inclined downwards at the same angle as the upper surface start portion of the forming apparatus base, the base upper portion being flat;

a distal end side wall continuously connected to the base upper portion, the distal end side wall extending upwards perpendicularly from the base upper portion; and an upper surface end portion of the forming apparatus base, the upper surface end portion being continuously connected to the distal end side wall, the upper surface end portion being disposed so as to be inclined downwards at the same angle as the upper surface start portion of the forming apparatus base, the upper surface end portion being flat, and wherein the lower die of the forming apparatus is provided at the lower part thereof with a shape corresponding to shapes of the side wall, the base lower portion, and the base side portion, and the upper die of the forming apparatus is provided at the lower part thereof with a shape corresponding to shapes of the base upper portion and the distal end side wall.

In another aspect of the present invention, the upper surface start portion of the forming apparatus base and the upper surface end portion of the forming apparatus base may not be disposed so as to be inclined downwards but may be disposed horizontally.

The height of the base side portion may be equal to the sum of the height of the distal end side wall and the height of the side wall when measured in a direction parallel to the base side portion.

The length of the base lower portion from the side wall to the base side portion may be equal to the length of the base upper portion from the base side portion to the distal end side wall.

The lower surface of the forming apparatus base may be disposed parallel to the ground.

The intersection between the upper surface start portion of the forming apparatus base and the side wall, the intersection between the base side portion and the base upper portion, and the intersection between the distal end side wall and the upper surface end portion of the forming apparatus base may have equal heights.

A recess defined by the side wall, the base lower portion, and the base side portion may be a recess defining a space for the lower receiving portion of the pouch-shaped case configured to receive a hexahedral electrode assembly therein, and a recess defined by the base upper portion and the distal end side wall may be a recess defining a space for the upper receiving portion of the pouch-shaped case configured to receive the hexahedral electrode assembly therein.

The present invention provides a method of manufacturing a pouch-shaped case using the pouch-shaped case forming apparatus, the method including:

1) disposing a laminate sheet for manufacture of a pouch-shaped case at the upper surface of the forming apparatus base;

2) disposing the lower die of the forming apparatus and the upper die of the forming apparatus in the recesses having the shapes corresponding thereto;

3) pressing the lower die of the forming apparatus and the upper die of the forming apparatus; and 4) removing the lower die of the forming apparatus and the upper die of the forming apparatus and collecting the deformed laminate sheet.

In addition, the present invention provides a method of manufacturing a pouch battery, the method including: disposing an electrode assembly in a lower receiving portion of a pouch-shaped case;

bending an upper receiving portion of the pouch-shaped case such that the upper part of the electrode assembly is received in the upper receiving portion of the pouch-shaped case; and hermetically sealing the pouch-shaped case.

In addition, the present invention provides a pouch battery manufactured using the above method.

The battery according to the present invention is a pouch-shaped battery configured to have a structure in which an electrode assembly is mounted in a laminate battery case.

In addition, the pouch-shaped battery according to the present invention is a pouch battery as a lithium secondary battery.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a pouch-shaped case forming apparatus and method according to the present invention will be described in detail with reference to the accompanying drawings.

Figure 6:
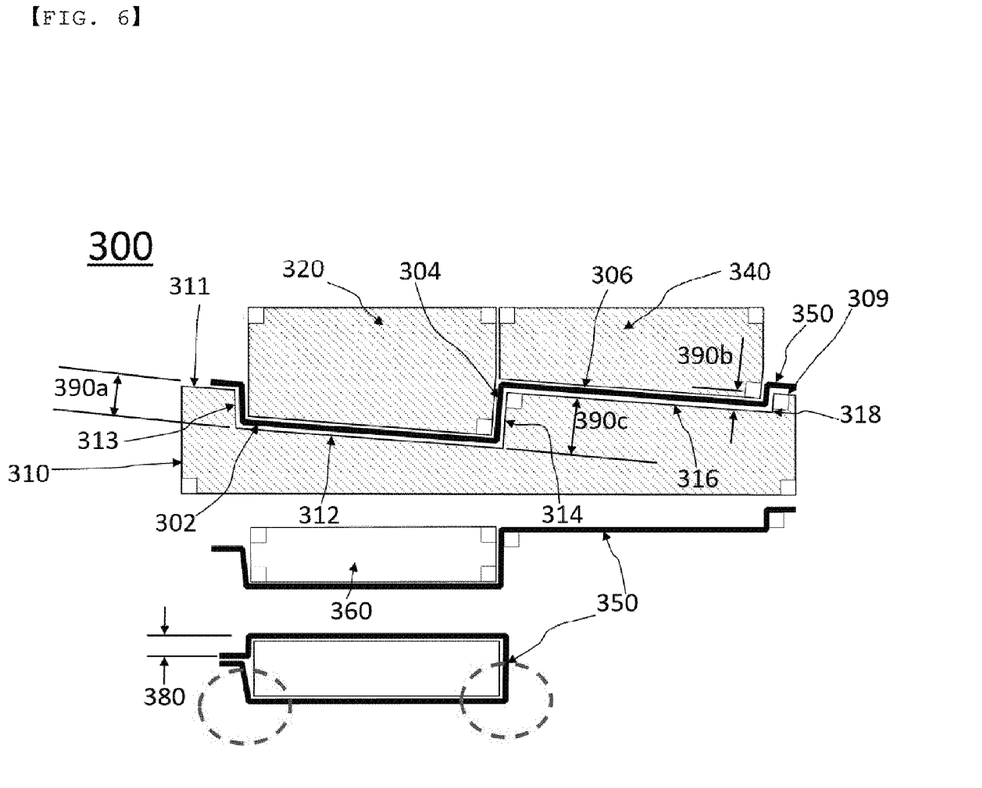
FIG. 6 is a sectional view of a forming apparatus according to the present invention having two cavities configured to manufacture a pouch-shaped case having a terrace step.
Figure 7:
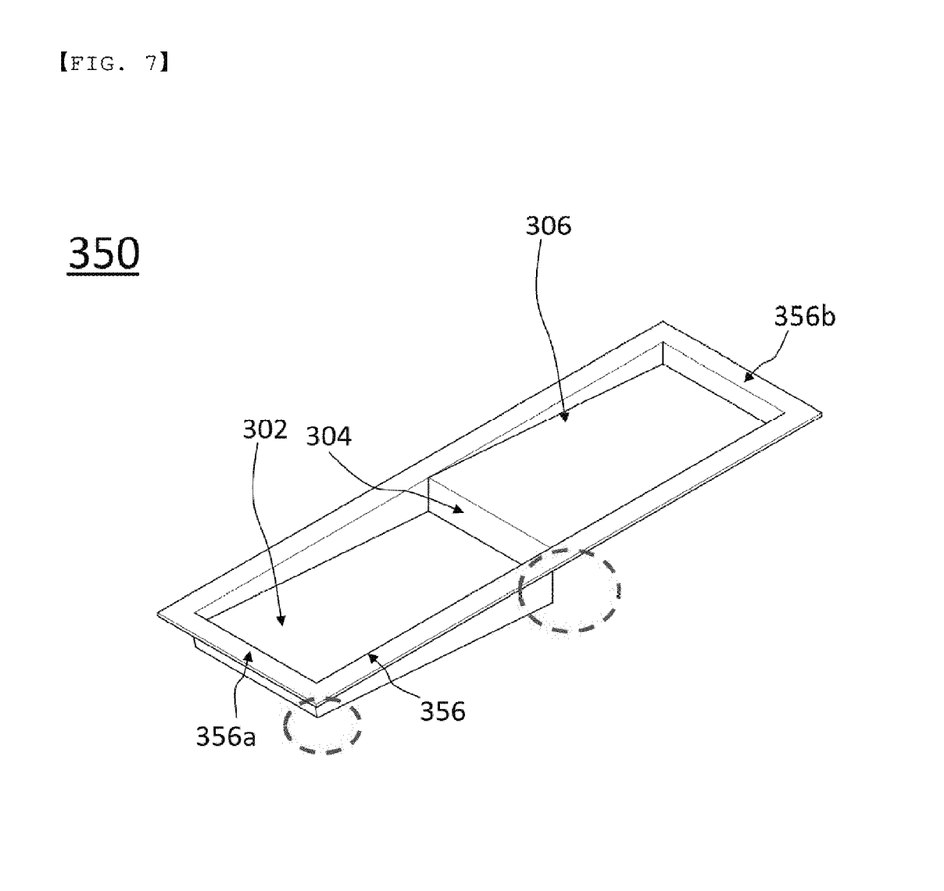
FIG. 7 is a perspective view of a pouch-shaped case manufactured using the same.

FIG. 6 is a sectional view of a forming apparatus according to the present invention having two cavities configured to manufacture a pouch-shaped case having a terrace step, and FIG. 7 is a perspective view of a pouch-shaped case manufactured using the same.

The present invention provides a pouch-shaped case forming apparatus 300 including: a forming apparatus base 310 provided with recesses configured to manufacture a lower receiving portion 302 of a pouch-shaped case configured to receive an electrode assembly therein and an upper receiving portion 306 of the pouch-shaped case continuously connected to the lower receiving portion 302, the upper receiving portion being configured to receive the electrode assembly 360 therein, by pressing; and a lower die 320 of the forming apparatus and an upper die 340 of the forming apparatus provided at the lower parts thereof with shapes corresponding to the recesses of the forming apparatus base 310, wherein the forming apparatus base 310 includes: an upper surface start portion 311 of the forming apparatus base, the upper surface start portion defining one end of the forming apparatus base 310, the upper surface start portion being disposed so as to be inclined downwards at a predetermined angle, the upper surface start portion being flat;

a side wall 313 continuously connected to the distal end of the upper surface start portion 311 of the forming apparatus base, the side wall extending downwards perpendicularly therefrom;

a base lower portion 312 continuously connected to the side wall 313, the base lower portion being disposed so as to be inclined downwards at the same angle as the upper surface start portion 311 of the forming apparatus base, the base lower portion being flat;

a base side portion 314 continuously connected to the base lower portion 312, the base side portion 314 extending upwards perpendicularly from the base lower portion 312;

a base upper portion 316 continuously connected to the base side portion 314, the base upper portion being disposed so as to be inclined downwards at the same angle as the upper surface start portion 311 of the forming apparatus base, the base upper portion being flat;

a distal end side wall 318 continuously connected to the base upper portion 316, the distal end side wall extending upwards perpendicularly from the base upper portion 316; and an upper surface end portion 309 of the forming apparatus base, the upper surface end portion being continuously connected to the distal end side wall 318, the upper surface end portion being disposed so as to be inclined downwards at the same angle as the upper surface start portion 311 of the forming apparatus base, the upper surface end portion being flat, and wherein the lower die 320 of the forming apparatus is provided at the lower part thereof with a shape corresponding to the shapes of the side wall 313, the base lower portion 312, and the base side portion 314, and the upper die 340 of the forming apparatus is provided at the lower part thereof with a shape corresponding to the shapes of the base upper portion 316 and the distal end side wall 318.

FIG. 7 is a perspective view of a pouch-shaped case 350 manufactured using the forming apparatus 300. A side portion 304 is formed at one surface of the lower receiving portion 302. The height of the side portion 304 corresponding to the height at which an electrode assembly 360 is disposed when the pouch-shaped case 350 is finally coupled, which is equal to a value obtained by adding the height of the side of the lower receiving portion 302 opposite the side portion 304 to the height of the deepest portion of the upper receiving portion 306. The pouch-shaped case 350 of FIG. 7 is different from a pouch-shaped case 450 of FIG. 9 in that the outer circumferential portion of the pouch-shaped case defines a single flat surface.

Meanwhile, in the pouch-shaped case 350 of FIG. 7, neither the side portion 304 of the lower receiving portion 302 nor the side surface opposite thereto are vertical (see dotted-line circles in FIG. 7). The side portion 304 is perpendicular to the lower receiving portion 302 and to the upper receiving portion 306, but the side surface opposite the side portion 304 is not perpendicular thereto. This results from consideration of the inclined degree of the side wall 313. Not all angles of the lower die 320 of the forming apparatus are degrees. The portion located at the corner of the side wall 313 has an angle of 90 degrees or higher.

Figure 8:
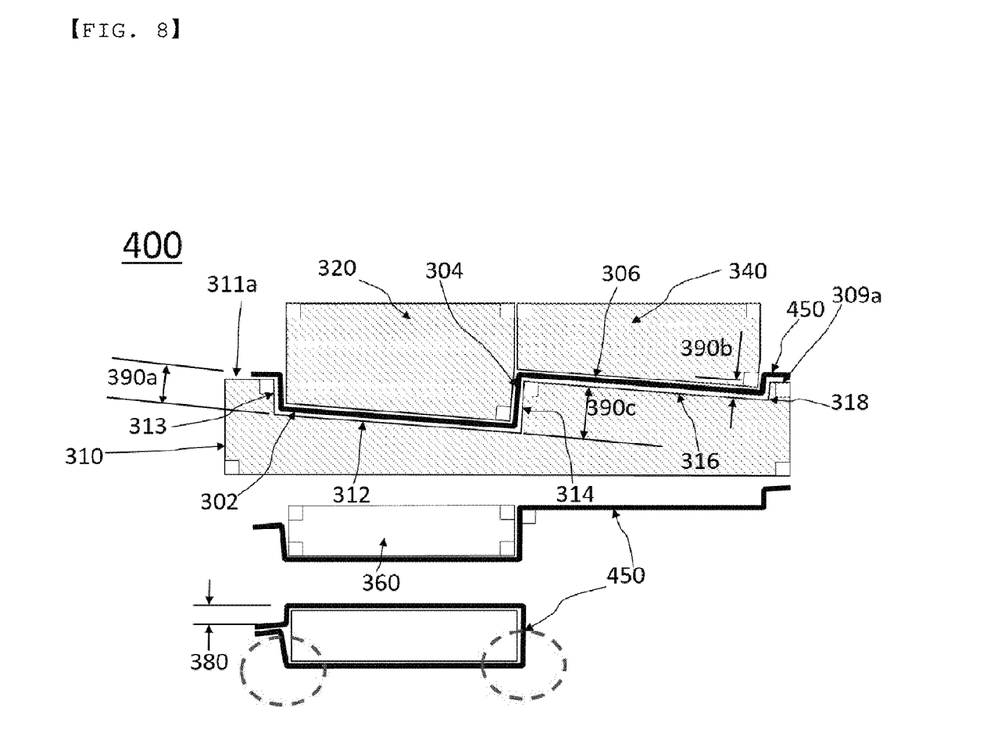
FIG. 8 is a sectional view of a forming apparatus according to another embodiment of the present invention having two cavities configured to manufacture a pouch-shaped case having a terrace step.
Figure 9:
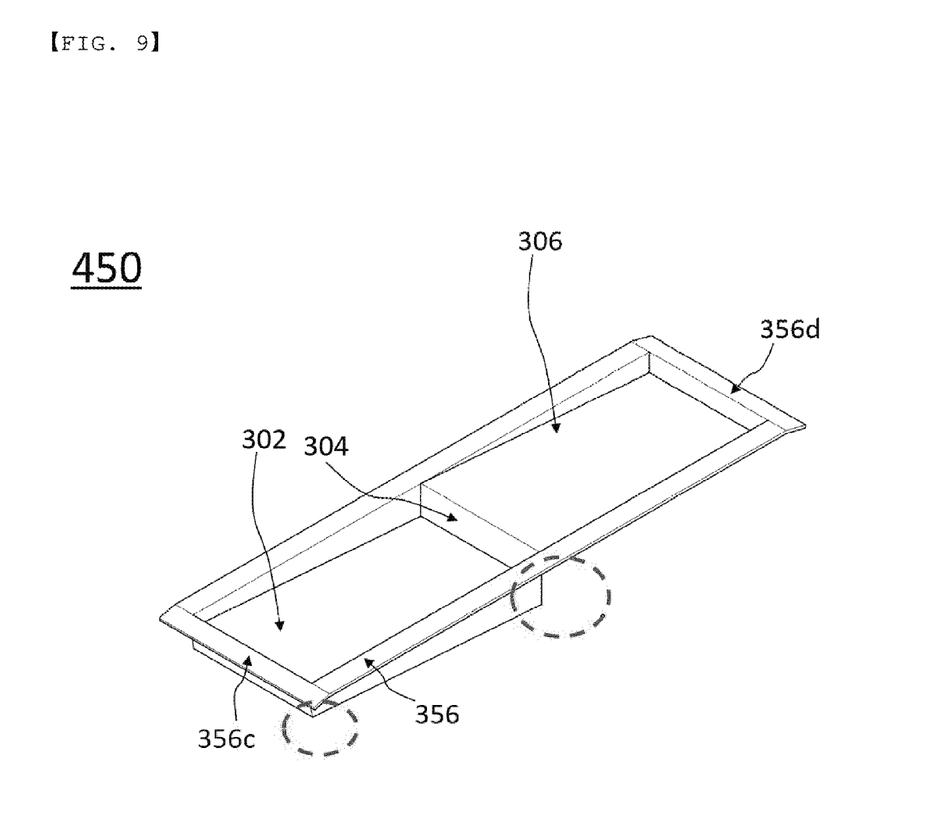
FIG. 9 is a perspective view of a pouch-shaped case manufactured using the same.

FIG. 8 is a sectional view of a forming apparatus 400 according to another embodiment of the present invention having two cavities configured to manufacture a pouch-shaped case having a terrace step, and FIG. 9 is a perspective view of a pouch-shaped case manufactured using the same.

In the apparatus of FIG. 8, an upper surface start portion 311a of the forming apparatus base and an upper surface end portion 309a of the forming apparatus base are not disposed so as to be inclined downwards but are disposed horizontally, compared to the apparatus of FIG. 6. In this case, as can be seen from the section of a pouch-shaped battery shown at the lower end of FIG. 8, joined portions of a pouch-shaped case 450 at the region thereof from which electrode tabs protrude are not parallel to each other but are inclined relative to each other. This form can be easily adjusted so as to be horizontal at the time of actual assembly of the battery. The embodiment of FIG. 6 or 8 is applicable in consideration of ease in manufacture of the pouch-shaped case.

The upper surface start portion 311a of the forming apparatus base and the upper surface end portion 309a of the forming apparatus base may be disposed so as to have different inclinations, which, however, is undesirable since additional processing is necessary.

The height 390c of the base side portion 314 may be equal to the sum of the height 390b of the distal end side wall and the height 390a of the side wall when measured in a direction parallel to the base side portion. That is, 390c is equal to the sum of 390a and 390b.

The length of the base lower portion 312 from the side wall to the base side portion 314 may be equal to the length of the base upper portion 316 from the base side portion 314 to the distal end side wall. That is, this means that the lower receiving portion 302 of the pouch-shaped case, in which an electrode assembly is disposed, the lower receiving portion being formed by the base lower portion 312, and the upper receiving portion 306 of the pouch-shaped case, which is formed by the base upper portion 316, have the same size so as to be coupled to each other.

The lower surface of the forming apparatus base 310 is disposed parallel to the ground.

It is preferable that the intersection between the upper surface start portion 311 or 311a of the forming apparatus base and the side wall 313, the intersection between the base side portion 314 and the base upper portion 316, and the intersection between the distal end side wall 318 and the upper surface end portion 309 or 309a of the forming apparatus base have the same height.

The pouch-shaped case 450 of FIG. 9 is identical to the pouch-shaped case 350 of FIG. 7 except for parts 356c and 356d of the outer circumferential portion thereof. Parts 356a and 356b of the outer circumferential portion of FIG. 7 define a single identical plane together with the outer circumferential portion 356; however, the parts 356c and 356d of the outer circumferential portion of FIG. 9 are inclined at the same angle. As can be seen from the sectional view of the pouch-shaped case 450 of FIG. 8, therefore, the parts of the outer circumferential portion are coupled to each other so as to be inclined downwards.

The same height is preferable, as described above, in consideration of processing a laminate sheet having a metal layer inserted into the middle thereof, quality thereof after processing, and work efficiency. The laminate sheet, before being processed into a pouch-shaped case, is flat. It is the most preferable that the laminate sheet be in a horizontal state when being disposed at the forming apparatus base 310. This is necessary in order to shape a laminate sheet that is continuously supplied, to cut the distal end of a shaped product, to remove the cut product from the forming apparatus base, and to continuously perform new shaping work.

In addition, a portion of the laminate sheet is stretched and deformed into a pouch-shaped case through the shaping process. In the case in which deformed regions are the same start points over the entire laminate sheet, the degree of deformation due to the entirely stretched region after processing may be uniformly distributed.

In addition, the forming apparatus base 310 may be designed such that the laminate sheet is shaped in the state in which the base lower portion 312 and the base upper portion 316 are horizontal, like the completed form of the pouch-shaped case shown in the middle figure of FIG. 6 or 8, rather than the state in which the base lower portion 312 and the base upper portion 316 are inclined as in the present invention.

In the case in which the laminate sheet is disposed at the forming apparatus base in a horizontal state, the difference between the height of the upper surface end portion 309 or 309a of the forming apparatus base, which is the highest, and the height of the upper surface start portion 311 or 311a of the forming apparatus base, which is the lowest, is too great. An additional support is provided at the upper surface start portion 311 or 311a of the forming apparatus base. When processing is performed in the horizontal state, therefore, the laminate sheet must be further stretched in order to process the upper surface start portion 311 or 311a of the forming apparatus base. In this case, however, the laminate sheet may be excessively thinned or torn. Even though the laminate sheet is not torn, the thicknesses of the laminate sheet at the lower receiving portion 302 and the upper receiving portion 306 of the pouch-shaped case, as a finished product, are different from each other.

In the case in which the laminate sheet is individually cut and the individual laminate sheet is processed in an inclined state, rather than in the horizontal state, continuous shaping is not smoothly performed, an additional means configured to support the laminate sheet depending on the inclination thereof is necessary, and additional effort to remove the pouch-shaped case from the forming apparatus base 310 after forming thereof is also necessary.

Meanwhile, in the forming apparatus base 310 according to the present invention, only the side wall 313 is disposed vertically, and the base side portion 314 and the distal end side wall 318 are perpendicular to the base lower portion 312 and the base upper portion 316.

As the result of being processed as described above, upper and lower abutting portions of the pouch-shaped case, as a finished product, are not vertical but are inclined. In order to solve this problem, it is sufficient to dispose the side wall 313 so as to be perpendicular to the base lower portion 312 and the base upper portion 316. In this case, however, the lower die 320 of the forming apparatus cannot be moved vertically but must be moved in an inclined direction.

In this case, it is necessary to design the lower die 320 of the forming apparatus and the forming apparatus base 310 so as to be aligned with each other in terms of not only position but also inclined angle. In addition, since pressing is performed in the inclined direction, a press configured to transmit force to the lower die 320 of the forming apparatus may be overworked. Furthermore, since the lower die 320 of the forming apparatus is moved in the inclined direction, there occurs a problem in that design and a movement path of a press configured to press the upper die 340 of the forming apparatus are also complicated in order to avoid interference with the upper die 340 of the forming apparatus.

The recess defined by the side wall, the base lower portion 312, and the base side portion 314 may be a recess defining a space for the lower receiving portion 302 of the pouch-shaped case, in which the hexahedral electrode assembly 360 is received.

The recess defined by the base upper portion 316 and the distal end side wall may be a recess defining a space for the upper receiving portion 306 of the pouch-shaped case, in which the hexahedral electrode assembly 360 is received.

In FIG. 6, the pouch-shaped case 350 is formed in the state in which the lower surface and the side surface thereof are inclined. The middle figure of FIG. 6 is a schematic view showing that the pouch-shaped case 350 is separated from the forming apparatus after forming, the pouch-shaped case is placed on the ground, and the electrode assembly 360 is disposed in the lower receiving portion 302. The right surface of the lower receiving portion 302 forms an angle of 90 degrees while the left surface of the lower receiving portion forms an angle of greater than 90 degrees. This inevitably occurs during the forming process of the forming apparatus. In the uppermost figure of FIG. 6, the side wall is disposed vertically such that the lower die 320 of the forming apparatus is discharged outside after forming of the pouch-shaped case 350; however, the base side portion 314 must be disposed at an angle of greater than 90 degrees. In the upper figure of FIG. 6, the base lower portion 312 and the base upper portion 316 are inclined. In the case in which the base lower portion and the base upper portion are disposed in the horizontal state, therefore, the left wall of the processed lower receiving portion 302 is further widened at an angle of greater than 90 degrees by the side wall. In order to apply the forming apparatus according to the present invention, therefore, it is preferable that the downwardly inclined angle of the upper surface start portion of the forming apparatus base not be great. It is preferable that the downwardly inclined angle of the upper surface start portion of the forming apparatus base be less than 10 degrees based on a plane, i.e. an angle of 0 degrees.

The present invention provides a method of manufacturing a pouch-shaped case using the pouch-shaped case forming apparatus 300, the method including:
1) disposing a laminate sheet 350 for manufacture of a pouch-shaped case at the upper surface of the forming apparatus base 310;
2) disposing the lower die 320 of the forming apparatus and the upper die 340 of the forming apparatus in the recesses having the shapes corresponding thereto;
3) pressing the lower die 320 of the forming apparatus and the upper die 340 of the forming apparatus; and
4) removing the lower die 320 of the forming apparatus and the upper die 340 of the forming apparatus and collecting the deformed laminate sheet.

In addition, the present invention provides a method of manufacturing a pouch battery, the method including: a step of disposing an electrode assembly 360 in a lower receiving portion 302 of a pouch-shaped case;
a step of bending an upper receiving portion 306 of the pouch-shaped case such that the upper part of the electrode assembly is received in the upper receiving portion 306 of the pouch-shaped case; and
a step of hermetically sealing the pouch-shaped case.

In addition, the present invention provides a pouch battery manufactured using the above method.

The battery according to the present invention is a pouch-shaped battery configured to have a structure in which an electrode assembly is mounted in a laminate battery case.

The pouch-shaped case according to the present invention is made of a pouch film (a laminate sheet) including a metal barrier layer. The pouch film may be preheated to 40° C. to 70° C. using an infrared lamp before shaping.

In addition, the pouch-shaped battery according to the present invention is a pouch battery as a lithium secondary battery.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE SYMBOLS

100: Conventional forming apparatus in case in which there is no terrace step
200: Conventional forming apparatus in case in which there is terrace step
300, 400: Forming apparatuses according to present invention in case in which there are terrace steps
106: Upper cover
110, 210, 310: Forming apparatus bases
120, 220, 240: Forming apparatus case dies
150, 250, 350, 450: Pouch-shaped cases
156, 256, 356: Outer circumferential portions
356a, 356c: Lower parts of front ends of outer circumferential portions
356b, 356d: Upper parts of front ends of outer circumferential portions
160, 260, 360: Electrode assemblies
190, 290, 390: Thicknesses of pouch-shaped cases capable of receiving electrode assemblies
280, 380: Terrace steps
311, 311a: Upper surface start portions of forming apparatus bases
313: Side wall
102, 202, 302: Lower receiving portions
304: Side portion
206, 306: Upper receiving portions
309, 309a: Upper surface end portion of forming apparatus base
312: Base lower portion
314: Base side portion
316: Base upper portion

318: Distal end side wall
320: Lower die of forming apparatus
340: Upper die of forming apparatus

INDUSTRIAL APPLICABILITY

The present invention is capable of providing a pouch-shaped case forming apparatus for forming a pouch-shaped case having a terrace step, wherein there are no dents or wrinkles at a pouch folding portion of the pouch-shaped case, a method of manufacturing a pouch-shaped case using the same, and a pouch-shaped case manufacturing using the forming apparatus.

The invention claimed is:

1. A forming apparatus for a pouch-shaped case, the forming apparatus comprising:
   a forming apparatus base having recesses configured to manufacture by pressing a lower receiving portion of the pouch-shaped case and an upper receiving portion of the pouch-shaped case continuously connected to the lower receiving portion, the lower receiving portion and the upper receiving portion together being configured to receive an electrode assembly therein;
   a lower die of the forming apparatus; and
   an upper die of the forming apparatus,
   wherein the forming apparatus base comprises:
   an upper surface start portion, the upper surface start portion defining a first end of the forming apparatus base, the upper surface start portion being inclined downwards at a predetermined angle relative to a lower surface of the forming apparatus base, the upper surface start portion being flat;
   a proximal end side wall continuously connected to a distal end of the upper surface start portion of the forming apparatus base, the proximal end side wall extending downwards from the upper surface start portion;
   a base lower portion continuously connected to the proximal end side wall, the base lower portion being inclined downwards at the predetermined angle relative to the lower surface, the base lower portion being flat;
   a base side portion continuously connected to the base lower portion, the base side portion extending upwards perpendicularly from the base lower portion;
   a base upper portion continuously connected to the base side portion, the base upper portion being inclined downwards at the predetermined angle relative to the lower surface, the base upper portion being flat;
   a distal end side wall continuously connected to the base upper portion, the distal end side wall extending upwards perpendicularly from the base upper portion; and
   an upper surface end portion, the upper surface end portion being continuously connected to the distal end side wall, the upper surface end portion being inclined downwards at the predetermined angle relative to the lower surface, the upper surface end portion being flat.

2. The forming apparatus according to claim 1, wherein a lower part of the lower die of the forming apparatus has a shape conforming to shapes of the proximal end side wall, the base lower portion, and the base side portion, and a lower part of the upper die of the forming apparatus has a shape conforming to shapes of the base upper portion and the distal end side wall.

3. The forming apparatus according to claim 1, wherein a height of the base side portion is equal to a sum of a height of the distal end side wall and a height of the proximal end side wall measured in a direction parallel to the base side portion.

4. The forming apparatus according to claim 1, wherein a length of the base lower portion from the proximal end side wall to the base side portion is equal to a length of the base upper portion from the base side portion to the distal end side wall.

5. The forming apparatus according to claim 1, wherein the lower surface of the forming apparatus base is disposed parallel to a ground in a gravitational frame of reference.

6. The forming apparatus according to claim 1, wherein an intersection between the upper surface start portion of the forming apparatus base and the proximal end side wall, an intersection between the base side portion and the base upper portion, and an intersection between the distal end side wall and the upper surface end portion of the forming apparatus base are located at equal distances from the lower surface of the forming apparatus base.

7. The forming apparatus according to claim 1, wherein a lower recess defined by the proximal end side wall, the base lower portion, and the base side portion defines a space for forming the lower receiving portion of the pouch-shaped case, and
   an upper recess defined by the base upper portion and the distal end side wall defines a space for forming the upper receiving portion of the pouch-shaped case.

8. A method of manufacturing a pouch-shaped case using the forming apparatus according to claim 7, the method comprising:
   disposing a laminate sheet for manufacture of the pouch-shaped case at an upper surface of the forming apparatus base;
   disposing the lower die of the forming apparatus and the upper die of the forming apparatus in the lower and upper recesses, respectively;
   pressing the lower die of the forming apparatus and the upper die of the forming apparatus into the lower and upper recesses, respectively, to deform the laminate sheet; and
   removing the lower die of the forming apparatus and the upper die of the forming apparatus from the lower and upper recesses, respectively, and removing the deformed laminate sheet from the forming apparatus base.

9. The method according to claim 8, further comprising:
   disposing the electrode assembly in the lower receiving portion of the pouch-shaped case;
   bending the upper receiving portion of the pouch-shaped case such that an upper part of the electrode assembly is received in the upper receiving portion of the pouch-shaped case; and
   hermetically sealing the pouch-shaped case, thereby manufacturing a pouch battery.

* * * * *